(12) United States Patent
Garnier

(10) Patent No.: US 12,280,886 B2
(45) Date of Patent: Apr. 22, 2025

(54) DETECTION OF A CROSSWIND ON A TURBOMACHINE FROM ENGINE DATA

(71) Applicant: SAFRAN AIRCRAFT ENGINES, Paris (FR)

(72) Inventor: Alméric Garnier, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 5 days.

(21) Appl. No.: 18/704,807

(22) PCT Filed: Oct. 19, 2022

(86) PCT No.: PCT/FR2022/051970
§ 371 (c)(1),
(2) Date: Apr. 25, 2024

(87) PCT Pub. No.: WO2023/073306
PCT Pub. Date: May 4, 2023

(65) Prior Publication Data
US 2024/0417093 A1   Dec. 19, 2024

(30) Foreign Application Priority Data

Oct. 27, 2021 (FR) ..................................... 2111407

(51) Int. Cl.
*B64D 31/06* (2024.01)
*F01D 21/00* (2006.01)
*G01P 5/00* (2006.01)

(52) U.S. Cl.
CPC ........... *B64D 31/06* (2013.01); *F01D 21/003* (2013.01); *G01P 5/00* (2013.01); *F05D 2260/83* (2013.01)

(58) Field of Classification Search
CPC ......... B64D 31/06; F01D 21/003; G01P 5/00; F05D 2260/83
See application file for complete search history.

(56) References Cited

U.S. PATENT DOCUMENTS

| 5,796,612 A | 8/1998 | Palmer |
| 5,797,105 A | 8/1998 | Nakaya et al. |

(Continued)

FOREIGN PATENT DOCUMENTS

| CN | 104520542 A | 4/2015 |
| CN | 113366194 A | 9/2021 |

(Continued)

OTHER PUBLICATIONS

International Search Report and Written Opinion of International Application No. PCT/FR2022/051970, mailed on Feb. 15, 2023, 13 pages. Full Translation.

(Continued)

*Primary Examiner* — Peter D Nolan
*Assistant Examiner* — Demetra R Smith-Stewart
(74) *Attorney, Agent, or Firm* — Bookoff McAndrews, PLLC

(57) ABSTRACT

A method including at least two turbomachines disposed on either side of a main axis of the aircraft, the turbomachines each including a low-pressure shaft and a set of at least three sensors for controlling the operation of the turbomachine. The method including the following steps: for each turbomachine, acquiring the data of the set of at least three sensors, for each turbomachine, normalizing the first pressure with respect to the speed of the low-pressure shaft and with respect to the second pressure, comparing the normalized first pressure of a turbomachine with the normalized first pressure of the at least one other turbomachine of the aircraft, detecting the presence of a crosswind based on the result of the comparison.

8 Claims, 2 Drawing Sheets

(56) References Cited

U.S. PATENT DOCUMENTS

| | | |
|---|---|---|
| 6,253,126 B1 | 6/2001 | Palmer |
| 2020/0392859 A1* | 12/2020 | Turner ..................... F02K 5/00 |
| 2023/0279872 A1* | 9/2023 | Miller ................... F04D 19/002 |
| | | 415/208.1 |
| 2024/0110521 A1* | 4/2024 | Wood ....................... F02C 7/24 |

FOREIGN PATENT DOCUMENTS

| | | |
|---|---|---|
| EP | 2895703 B1 | 9/2016 |
| FR | 2097897 | 3/1972 |
| WO | 2014023891 A1 | 2/2014 |
| WO | 2020201652 A1 | 10/2020 |

OTHER PUBLICATIONS

Search Report issued in French Application No. 2111407, mailed Jun. 17, 2022.
First Search and Notice of Examination Opinion issued in application CN202280077150.5, mailed Aug. 30, 2024.

* cited by examiner

[Fig. 1]
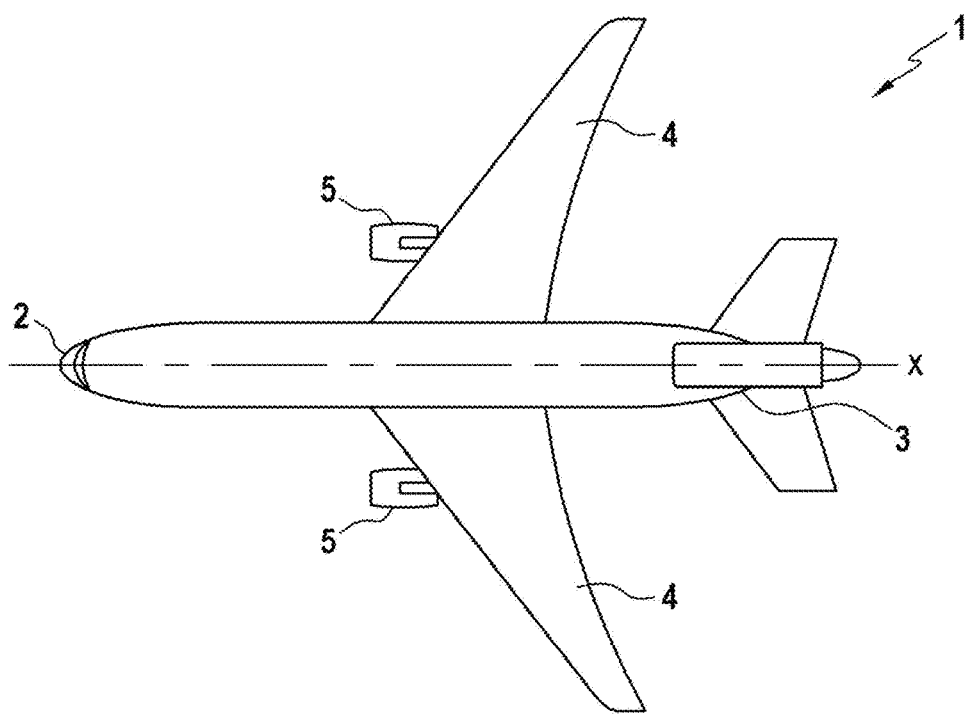
[Fig. 2]
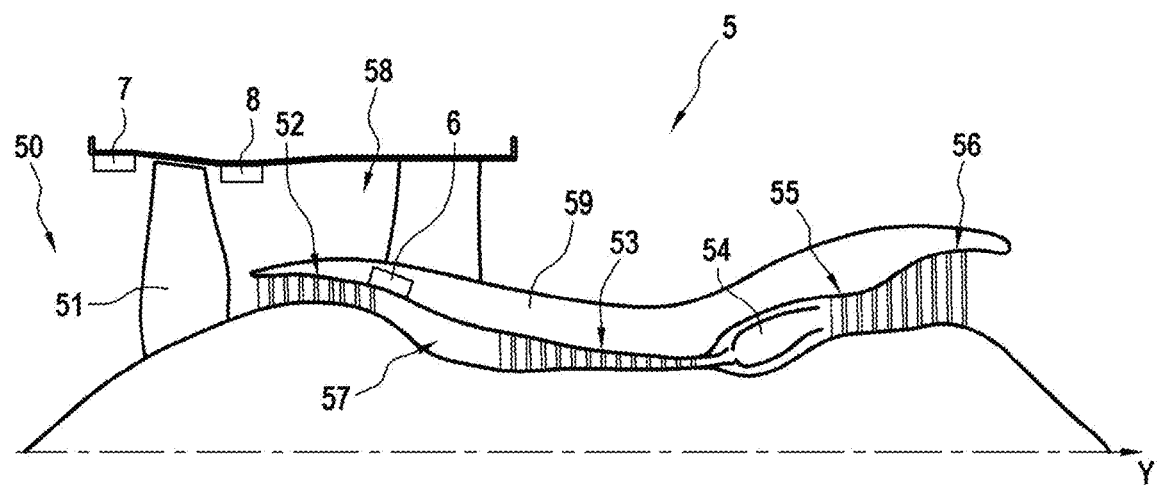

[Fig. 3]
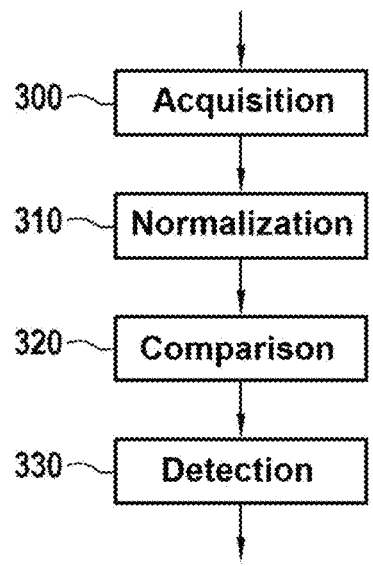
[Fig. 4]
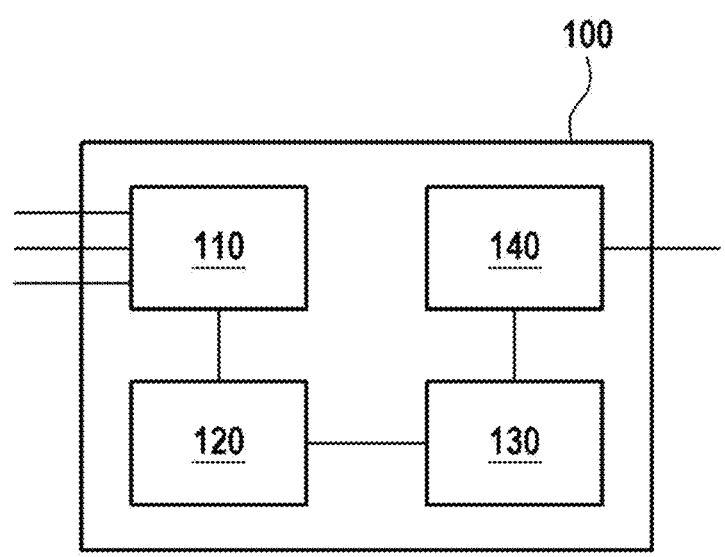

DETECTION OF A CROSSWIND ON A TURBOMACHINE FROM ENGINE DATA

CROSS-REFERENCE TO RELATED APPLICATION(S)

This is a National Stage Application under 35 U.S.C. § 371 of International Application No. PCT/FR2022/051970 filed on Oct. 19, 2022, now published as WO 2023/073306 A1 which claims priority to French Patent Application No. 2111407 filed on Oct. 27, 2021.

TECHNICAL FIELD

The invention relates to the field of monitoring of an aircraft turbomachine, and more specifically the detection of a crosswind, particularly for assistance with aeronautical maintenance.

PRIOR ART

At present predictive maintenance services are routinely put in place. In this way, engine manufacturers seek to anticipate as much as possible any failures liable to affect engines with which aircraft are equipped. The introduction of these services has also been boosted by the arrival on the civil aviation market of contracts by flight hour.

These predictive maintenance services are essentially based on measurements acquired during one or more flight missions of the aircraft, and which are representative not only of the behavior of an engine, but also of the context of acquisition encountered by this engine in the course of the flight. More specifically, logistical and hardware requirements useful for the delivery of maintenance services are offered, based on the analysis of said measurements.

By way of example, the measurements representative of the behavior of the engine may relate to different variables, such as a speed of rotation of a turbine shaft, a pressure and/or a temperature and/or a level of oil in an oil circuit, a fuel flow rate, an exhaust gas temperature, etc. The measurements representative of the acquisition context, meanwhile, may concern other variables, such as for example the weather, piloting, ageing of the engine, weight of the airplane etc.

Conventionally, said measurements are acquired by acquiring means integrated on board an aircraft, and provided to a receiver device on the ground in possession of the aircraft manufacturer, in order to be analyzed. This provision is done either during the flight mission, typically by transmission via a satellite link, or after landing by downloading a memory in which said measurements have been stored.

For example, there is known from document WO 2020/201652 a method for monitoring an engine on the basis of at least two measurements, one being normalized with respect to the other, and the monitoring consisting in the detection of an anomaly on an abnormal drift of the normalized indicator.

There is also known from the document FR 2 097 897 a method for starting a turbomachine in the presence of a tailwind on the basis of the monitoring of a turbomachine based on a set of information.

However, in the absence any information being escalated from the avionics (airplane system such as a Pitot probe) and/or weather stations on the ground, no method is known for determining whether or not an engine of an aircraft has experienced a crosswind on the basis of satellite data, such as "ACARS" data, or on the basis of the data from the engine, such as "Continuous" (for "Continuous Engine Operational Data") data on the ground, and still less in flight. The absence of these data can be related to:

failures of the avionics system, for example related to a technical problem preventing the onboard measurement, acquisition, processing, and recording systems of the airplane airframe, either to communicate to the ground systems of the aircraft manufacturer, of the airline and/or of an Original Equipment Manufacturer (OEM) such as an aircraft engine builder, or, independently of the agreements of the airline or of the aircraft manufacturer, to transmit the data (they are not retrieved due to a technical failure of the retrieval/transmission system on board the aircraft: computer, transmission system, data storage device), blocking of access to avionic data (OEM prohibited from accessing this data—decision of the airline), related for example to a problem of data governance, or the unavailability of the avionic data (the airplane may have emitted the data and they are stored, and available to the OEM, but the OEM cannot manage to retrieve them due to technical problems with the ground data retrieval system: for example the information systems of the OEM or implemented on board the airplane (airline system) cannot manage to communicate or do not provide the required performance).

blocking of access to ground data (ground pressure sensors, radars, and any ground systems in the perimeter of the airport, at weather station or state level, etc.) or irrelevant (to determine the current situation of the aircraft in flight).

However, knowledge of the experienced crosswind can be used to guide the control of an engine (at start-up in particular), but also to improve the damage models (asymmetrical physical restrictions on blading, a shaft) for a turbomachine or else to normalize other types of monitoring sensitive to this aerodynamic phenomenon.

Both for taxiing conditions and for in-flight conditions of an aircraft, there is a need to detect the presence and direction of any crosswind acting on aircraft engines on the basis of engine data, in the absence of any data coming from the ground station, or data from the avionics.

SUMMARY OF THE INVENTION

The aim of the invention is to supply a solution for detecting crosswind conditions for turbomachines of an aircraft in the absence of data coming from ground stations or satellite data or avionics data.

A subject of the invention makes provision for a method for detecting the presence of a crosswind for a turbomachine of an aircraft, the aircraft including at least two turbomachines disposed on either side of a main axis of the aircraft extending between a nose of the aircraft and a tail of the aircraft, said turbomachines each including a low-pressure shaft and a set of at least three sensors for controlling the operation of the turbomachine, a first sensor of the set being configured to measure the speed of the low-pressure shaft, a second sensor of the set being configured to measure a first pressure or temperature at a first location on the turbomachine, and a third sensor of the set being configured to measure a second pressure or temperature at a second location on the turbomachine.

According to a general feature of the invention, the method comprises the following steps:

for each turbomachine, acquiring (E0) the data of the set of at least three sensors, for each turbomachine, normalizing (E1) said first pressure or temperature with respect to the speed of the low-pressure shaft and with respect to the second pressure or temperature, comparing (E2) the normalized first pressure or temperature of a turbomachine with the normalized first pressure or temperature of said at least one other turbomachine of the aircraft, detecting (E3+E4) the presence of a crosswind based on the result of the comparison.

The step of normalizing the first pressure or temperature makes it possible to make the first pressures of each turbomachine of the aircraft comparable.

For each turbomachine, the first pressure or temperature sensor configured to measure the first pressure or temperature is disposed on one and the same side of the turbomachine, since the turbomachines are generally manufactured in serial production without any left/right distinction of position. However, the axis of the turbomachines about which the movable elements are in rotation is directed along one and the same direction corresponding to the main axis of the aircraft. Consequently, the turbomachines of one and the same aircraft should undergo the same aerodynamic disturbance related to their respective nacelles. Therefore, in theory, no difference of value should be discerned between the first pressures or temperatures measured on the turbomachines of one and the same aircraft.

However, there is a phenomenon of aerodynamic blanking also known as Dutch Roll. The dynamics of Dutch Roll are well-known and are evidence of the natural stability (by design) of an airplane. The phenomenon is initiated and sustained by the successive aerodynamic blankings of a wing by the fuselage of the airplane body when the airplane begins a yaw.

More precisely, the airplane first begins a right yaw. The right wing is then blanked by the body of the airplane. The blanked wing undergoes a relative loss of wind speed, its lift drops by comparison with the left wing, which undergoes the reverse phenomenon: a moment is set up along the axis of the airplane and the roll toward the right begins. The left wing rises, its drag increases (and its lift to a lesser extent), which introduces a moment along the control surface axis. The airplane then begins a left yaw. The blanking becomes attenuated, the right wing regains its lift and the airplane begins a left roll. And so on.

Aerodynamic blanking, or Dutch Roll, generated by the airplane body and experienced by one or the other of the turbomachines introduces a difference in the values of the first pressures or temperatures measured for the turbomachines of one and the same aircraft. This difference in value is determined in the comparing step and makes it possible to supply an indication of the presence of a crosswind.

According to a first aspect of the method for detecting a tailwind, the method may further comprise determining the azimuthal direction of the detected crosswind based on the result of the comparison.

According to a second aspect of the method for detecting a tailwind, the method may further comprise determining the speed of the detected crosswind.

According to a third aspect of the method for detecting a tailwind, the detecting step is done based on an averaged result of the comparing step, the averaged result being obtained based on the comparison of an average normalized first pressure or temperature with an averaged normalized first pressure or temperature of said at least one other turbomachine of the aircraft, the averages being taken based on the measurements acquired during one and the same time window, or else based on an average of the comparisons made based on the results of the comparisons determined during a time window.

The average of the measurements or the average of the comparisons can be taken over an acquisition period of 30 s for example, to have approximately 1200 measurements. The averaged comparison may be made over sliding time windows in order to avoid false alarms related to fleeting local disturbances (gusts of wind, stall of the flow at the edge of the nacelle lips), especially if the first measured pressure is a total pressure.

According to a fourth aspect of the method for detecting a tailwind, with respect to the direction of the air flow in the turbomachine, the first pressure or temperature of a turbomachine is measured upstream of a low-pressure compressor of the turbomachine, and the second pressure or temperature is measured downstream of said low-pressure compressor, the low-pressure compressor being coupled to said low-pressure shaft.

In another subject of the invention, provision is made for an aircraft comprising at least two turbomachines disposed on either side of a main axis of the aircraft extending between a nose of the aircraft and a tail of the aircraft, said turbomachines each including a low-pressure shaft and a set of at least three sensors for controlling the operation of the turbomachine, a first sensor of the set being configured to measure the speed of the low-pressure shaft, a second sensor of the set being configured to measure a pressure or a temperature at a first location of the turbomachine, and a third sensor of the set being configured to measure a pressure or a temperature at a second location of the turbomachine.

According to a general feature of the aircraft according to the invention, the aircraft comprises a system for detecting a crosswind for an aircraft turbomachine, the system including:

means for acquiring data from said sets of at least three sensors, normalizing means configured to normalize said first pressure or temperature with respect to the speed of the low-pressure shaft and with respect to the second pressure or temperature, comparing means configured to compare the normalized first pressure or temperature of a turbomachine with the normalized first pressure or temperature of said at least one other turbomachine of the aircraft, and detecting means configured to generate a signal of the presence of a crosswind based on the signal delivered by the comparing means.

The temperature sensors may be chosen from among different types such as thermocouple sensors or else resistance temperature detectors (RTD), and the pressure sensors may be chosen from among different types such as strain gages, piezoelectric gages, semiconductor pressure sensors, and others. The pressure sensors may be sensors measuring a static pressure and/or a total pressure. Moreover, the two pressure sensors may be integrated into an acquisition unit in which channels guide the pressure take-offs from the points of interest.

According to a first aspect of the aircraft, the turbomachines may be symmetrical with respect to the main axis of the turbomachine.

According to a second aspect of the aircraft, said second sensor and said third sensor of the set measure one and the same thermodynamic quantity from among the pressure or the temperature.

According to a third aspect of the aircraft, the sensors for controlling the operation of the turbomachine of each set are sensors of the electronic control system of the turbomachines of the aircraft.

The method is based on the acquisition and processing of the data from the control sensors of each engine of such an aircraft. The term "control sensors" refers to the sensors involved in the control of the thrust and the maintaining of the correct operation of the turbomachine: along with the engine control computer, they are part of the electronic control system also known as "FADEC", meaning "Full Authority Digital Engine Control".

According to a fourth aspect of the aircraft, the second sensor is mounted upstream of a fan of the turbomachine with which the second sensor is associated, and the third sensor is mounted downstream of the fan of the turbomachine with which the third sensor is associated, the fan being coupled to said low-pressure shaft.

BRIEF DESCRIPTION OF THE DRAWINGS

FIG. 1 schematically represents an aircraft.
FIG. 2 schematically represents a section view of a turbomachine of the aircraft of FIG. 1.
FIG. 3 shows a logic diagram of a method for detecting the presence of a crosswind for a turbomachine of the aircraft of FIG. 1.
FIG. 4 schematically represents a system for detecting the presence of a crosswind for a turbomachine 5 of an aircraft of FIG. 1.

DESCRIPTION OF THE EMBODIMENTS

FIG. 1 shows a schematic view of an aircraft 1 comprising a nose 2, a tail 3, a main axis X extending between the nose 2 and the tail 3 of the aircraft 1, two wings 4 extending each on one side of the main axis X, and two turbomachines 5 symmetrically disposed with respect to the main axis X, each turbomachine 5 being mounted on a separate wing 4.

FIG. 2 schematically represents a section view of an upper half of a turbomachine 5 of the aircraft 1.

In the example illustrated in FIG. 2, each turbomachine 5 of the aircraft 1 is a twin spool bypass turbomachine. The turbomachine 5 comprises, from upstream to downstream along an axis Y (parallel to the main axis X) of the turbomachine 1 in the direction of flow of the gas, an air inlet 50, a fan 51, a low-pressure (or LP) compressor 52, a high-pressure (or HP) compressor 53, a combustion chamber 54, a high-pressure turbine 55, and a low-pressure turbine 56.

The turbomachine 5 further comprises a primary air path 57 and a secondary air path 58 separated by an intermediate casing 59. The primary air path 57 extends downstream of the fan 51 and is radially delimited by the intermediate casing 59. The primary air path 57 comprises the low-pressure compressor 52, the high-pressure compressor 53, the combustion chamber 54 and the high and low-pressure turbines 55 and 56. The secondary air path 58 extends around the primary air path 57, also downstream of the fan 51. The secondary air path 58 extends radially between the intermediate casing 59 and an outer casing extending around the intermediate casing 59.

The turbomachine 5 further comprises a set of three sensors for controlling the operation of the turbomachine 5, the set including a first sensor 6 configured to measure the speed of the low-pressure shaft, a second sensor 7 configured to measure a first pressure at the height of the air inlet 50 of the turbomachine 5, i.e. upstream of the fan 51, and a third sensor 8 configured to measure a second pressure downstream of the fan 51 of the turbomachine 5.

The pressure sensors are deformation gages or piezoelectric gages, or semiconductor pressure sensors.

The first, second and third sensors of each turbomachine 5 are sensors integrated into the electronic control system known as FADEC.

FIG. 3 shows a logic diagram of a method for detecting the presence of a crosswind for a turbomachine 5 of an aircraft 1.

The method first comprises a first step 300 of acquiring data from the three sensors 6, 7 and 8 for each of the two turbomachines 5 of the aircraft.

The method then comprises a second step 310 of normalizing the first pressure for each turbomachine 5. This normalizing step 310 consists in normalizing for each turbomachine 5 the first pressure measured by the second sensor 7, i.e. the pressure upstream of the fan 51, with respect to the speed of the low-pressure shaft measured by the first sensor 6 and with the pressure measured by the third sensor 8.

In a third step 320, the method provides a comparison of the first pressure, thus normalized, of a turbomachine 5 of the aircraft 1 with respect to the normalized first pressure of the other turbomachine 5 of the aircraft 1. The comparison can be made by subtracting the values or by determining a ratio of the two values.

In a fourth step 330, the method comprises a step of detecting the presence of a crosswind based on the result of the comparison. The detecting step in particular comprises a comparison of the result of the subtraction or of the division computed in the preceding step 320 with a detection threshold to determine whether or not there is a crosswind present.

The detecting step moreover makes it possible, based on the sign of the result of the subtraction or based on the value of the computed ratio, to determine the azimuthal direction of the detected crosswind.

The detecting step can be carried out based on an averaged comparison result. To do this, an average can be taken of the results of the comparisons over a time window of approximately 30 seconds for example. Alternatively, one may take an averaged comparison, first by taking an average of the data acquired by the sensors and by comparing the averages thus obtained after normalization.

FIG. 4 schematically represents a system 100 for detecting a crosswind for an aircraft 1 turbomachine 5. The system 100 includes means 110 for acquiring data from the three sensors, normalizing means 120 configured to normalize said first pressure with respect to the speed of the low-pressure shaft and with respect to the second pressure or temperature, comparing means 130 configured to compare the normalized first pressure of a turbomachine with the normalized first pressure of the other turbomachine 5, and detecting means 140 configured to generate a signal of the presence of a crosswind based on the signal delivered by the comparing means.

The invention thus makes it possible to detect crosswind conditions for turbomachines of an aircraft in the absence of data from ground stations or satellite data or avionics data.

The invention claimed is:

1. A method for detecting the presence of a crosswind for a turbomachine of an aircraft, the aircraft including at least two turbomachines disposed on either side of a main axis of the aircraft extending between a nose of the aircraft and a tail of the aircraft, said turbomachines each including a low-pressure shaft, a low-pressure compressor coupled to said low-pressure shaft, and a set of at least three sensors for controlling the operation of the turbomachine, a first sensor of the set being configured to measure a speed of the low-pressure shaft, a second sensor of the set being configured to measure a first pressure or temperature upstream of the low-pressure compressor of the turbomachine with respect to the direction of the air flow in the turbomachine, and a third sensor of the set being configured to measure a second pressure or temperature downstream of said low-pressure compressor with respect to the direction of the air flow in the turbomachine, the method comprising the following steps:
for each turbomachine, acquiring the data of the set of at least three sensors,
for each turbomachine, normalizing said first pressure or temperature of a turbomachine with respect to the speed of the low-pressure shaft and with respect to the second pressure or temperature,
comparing the normalized first pressure or temperature of a turbomachine with the normalized first pressure or temperature of said at least one other turbomachine engine of the aircraft,
detecting the presence of a crosswind based on the result of the comparison.

2. The method for detecting the presence of a crosswind as claimed in claim 1, further comprising determining the azimuthal direction of the detected crosswind based on the result of the comparison.

3. The method for detecting the presence of a crosswind as claimed in claim 1, further comprising determining the speed of the detected crosswind.

4. The method for detecting the presence of a crosswind as claimed in claim 1, wherein the detecting step is done based on an averaged result of the comparing step, the averaged result being obtained based on a comparison of an average normalized first pressure or temperature with an averaged normalized first pressure or temperature of said at least one other turbomachine of the aircraft, the averages being taken based on the measurements acquired during one and the same time window, or else based on an average of the comparisons made based on the results of the comparisons determined during a time window.

5. An aircraft comprising at least two turbomachines disposed on either side of a main axis of the aircraft extending between a nose of the aircraft and a tail of the aircraft, said turbomachines each including a low-pressure shaft, a fan coupled to the low-pressure shaft, and a set of at least three sensors for controlling the operation of the turbomachine, a first sensor of the set being configured to measure a speed of the low-pressure shaft, a second sensor of the set mounted upstream of the fan of the turbomachine with which the second sensor is associated, the second sensor being configured to measure a pressure or a temperature, and a third sensor of the set mounted downstream of the fan of the turbomachine with which the third sensor is associated, the third sensor being configured to measure a pressure or a temperature, wherein it comprises a system for detecting a crosswind for an aircraft turbomachine, the system including:
means for acquiring data from said sets of at least three sensors,
normalizing means configured to normalize said first pressure or temperature with respect to the speed of the low-pressure shaft and with respect to the second pressure or temperature,
comparing means configured to compare the normalized first pressure or temperature of a turbomachine with the normalized first pressure or temperature of said at least one other turbomachine engine of the aircraft, and
detecting means configured to generate a signal of the presence of a crosswind based on the signal delivered by the comparing means.

6. The aircraft as claimed in claim 5, wherein the turbomachines are symmetrical with respect to the main axis of the aircraft.

7. The aircraft as claimed in claim 5, wherein said second sensor and said third sensor of the set measure one and the same thermodynamic quantity from among the pressure or the temperature.

8. The aircraft as claimed in claim 5, wherein the sensors for controlling the operation of the turbomachine of each set are sensors of the electronic control system of the turbomachines of the aircraft.

* * * * *